2,977,243
Patented Mar. 28, 1961

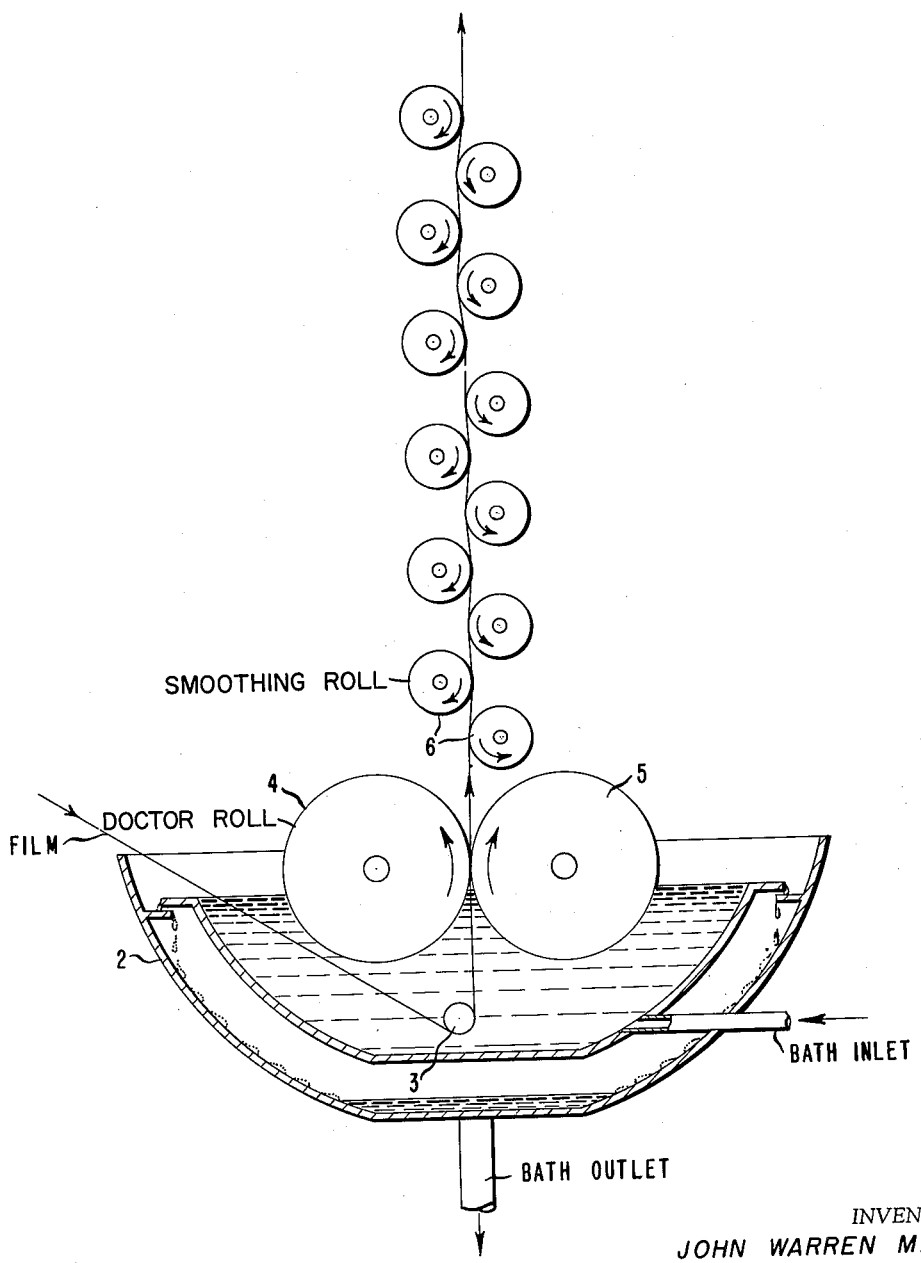

2,977,243

COATING PROCESS

John Warren Meier, Madison, Tenn., assignor to E. I. du Pont de Nemours and Company, Wilmington, Del., a corporation of Delaware Filed Oct. 2, 1958, Ser. No. 764,889

9 Claims. (Cl. 117—64)

This invention relates to the coating of continuous webs, and more particularly to an improved process for uniformly coating continuous, flexible, transparent webs of hydrophilic organic polymeric material, e.g., regenerated cellulose film, from an aqueous dispersion coating composition.

The continuous coating of the surfaces of continuous, flexible, transparent webs of hydrophilic organic polymeric material, e.g., regenerated cellulose film, has been successfully carried out for a number of years by first passing the film through a dip tank containing a liquid coating composition; then through a doctoring device which regulates the amount of coating composition retained on the web surfaces; then through a smoothing device to smooth out and improve the appearance of the coating; and finally through a heated drying zone. However, with the advent of polymeric coatings, e.g., vinylidene chloride copolymer coatings, applied from aqueous dispersions of the polymer, coating defects known as striations (i.e., minute grooves or channels in the coating which appear as a series of essentially parallel lines) are intensified due to a combination of (1) the high solids content of aqueous dispersion coating baths, and (2) the rapid imbibition of the aqueous dispersant into the hydrophilic web which dehydrates and hence accelerates the hardening of the coating. Expedients heretofore employed to smooth the coating before it sets (hardens) are generally found to be inadequate and generally unsatisfactory in eliminating striations in aqueous dispersion coatings on hydrophilic base materials either because they do not function effectively within the very short period of time elapsing between the time the coating is metered on the base material and the time the coating becomes too hard to respond to the action of smoothing devices, or the smoothing devices impose too much drag causing marking of the coating and, in many instances, breaking of the web.

An object of this invention, therefore, is to provide an improved process for the aqueous dispersion coating of continuous, flexible, transparent webs of hydrophilic organic polymeric material which avoids the difficulties noted above. A more specific object is to provide for the formation of a uniform, smooth coating of organic polymeric material, e.g., vinylidene chloride copolymer, on continuous regenerated cellulose and like flexible, transparent, hydrophilic polymeric films using aqueous dispersion coating techniques. The foregoing and additional objects will more clearly appear from the description which follows.

These objects are realized by the present invention which, briefly stated, comprises continuously applying a uniform coating of an aqueous dispersion coating composition having a viscosity of not more than 25 centipoises, over the surfaces of a continuous advancing, flexible, transparent web of hydrophilic organic polymeric material, e.g., regenerated cellulose film, advancing at a constant rate of at least 100 yards per minute; immediately thereafter tangentially contacting the coated surfaces of said advancing web with a bank of at least 10 positively driven, successively positioned cylindrical surfaces alternately disposed on each side of said web and rotating in a direction opposite to the direction of travel of said web at a peripheral speed of from 65% to 85% of the linear speed of travel of said web.

The process of this invention will be hereinafter described with specific reference to the coating of regenerated cellulose film with an aqueous dispersion of vinylidene chloride copolymers. It is to be understood, however, that the process is applicable to coat flexible, transparent webs or films of any hydrophilic organic polymeric material such as polyvinyl alcohol, hydroxyethyl cellulose, hydroxypropyl cellulose, partially hydrolyzed ethylene-vinyl acetate copolymers, etc., as well as webs or films of these materials modified by the addition of plasticizers, softeners, dyes, pigments, sizes, fillers, etc. Similarly, any aqueous coating dispersion useful for controlling the degree of moistureproofness, and/or the gas permeability, and/or the heat sealability, and/or for otherwise modifying the base film, may be effectively smoothed through the employment of the present invention. In general, coatings which are applicable in accordance with the present invention are those coatings which are most desirable within the packaging field such as controlled water vapor and gas permeable coatings, heat sealing and non-heat sealing coatings; for example, coating compositions such as disclosed in U.S. Patents 2,819,984, 2,805,963, 2,748,027, 2,744,080, and 2,570,478.

The process of this invention will now be described with reference to the accompanying drawing wherein the single figure is a schematic illustration of a typical arrangement of apparatus for carrying out the present process.

Referring to the drawing: The continuous film to be treated is passed under uniform tension and at a uniform speed in excess of 100 yards per minute from a supply roll, casting machine or other source (not shown) into a dip tank 2 containing a bath of aqueous dispersion coating composition. The film is guided in and out of the bath in the dip tank by a dip rod 3 and passes from the bath through the nip of a set of doctor rolls 4 and 5 spaced so as to meter on both surfaces of the film a dispersion coating of predetermined thickness. Immediately after leaving the doctor rolls and while the coating thereon is still wet, the coated film is conducted vertically through a bank of rotating smoothing rolls 6 positively driven by any suitable means (not shown) in a direction opposite to the direction of travel of the film at a peripheral speed of from 65% to 85% of the linear speed of travel of the film. The smoothing rolls are alternately disposed forming two sets of rolls, one at each side of the film, each set comprising at least five rolls. The contact between the film and rolls is substantially tangential so as to impose minimum drag on the film. After passing through the bank of smoothing rolls the film is dried by conventional means (not shown) to remove the water and set or harden the coating.

The peripheral speed and direction in which the smoothing rolls are operated are critical factors in obtaining the desired striation-free coated surface. The rolls must be driven in a direction opposite to the direction of travel of the coated web at a peripheral sped within the range of 65%–85% of the linear speed of travel of the film. At roll speeds below 65% of the film speed the appearance of the film due to striations is so poor as to be unacecptable. A peripheral speed of over 85% of the film speed approaches the critical speed at which the nip between the smoothing rolls and the film seems to be wiped free of coating fluid and the resulting high drag breaks the film. The optimum peripheral smoothing roll speed has been found to be 74% to 78% of the film speed in the reverse direction irrespective of the film speed so long as the latter exceeds 100 yards per minute.

The amount of "wrap" or the degree of contact between the smoothing rolls of the film must be controlled since excessive wrap causes drag which increases film tension causing "tension wrinkles" at the smoothing rolls, thus marking the coating. As mentioned above, if the drag becomes excessive, it will break the film. The amount of wrap has been found to be that which is just sufficient to maintain contact all along the roll. Preferably, the film should have substantially tangential contact. For practical operation a slight degree of wrap beyond purely tangential contact is desirable, about $\frac{1}{16}$ inch, to insure uniform film contact along all the rolls, but it must be kept to this minimum. More wrap causes more drag which necessarily must be kept to a minimum. Higher degrees of smoothing roll wrap, however, apparently has little effect on striations.

The diameter of the smoothing rolls also contributes to the striation level of the film appearance. Small rolls appear to improve (lower) the striation level, consequently the roll diameter should not exceed that required to lend the degree of rigidity necessary to prevent whipping or flexing of the roll at the desired rotational speeds.

The larger the number of smoothing rolls, the more effective the smoothing action and consequently the film appearance, as measured primarily by the striation level. Too few rolls are ineffective and too many rolls reach into the more viscous regions of the coating, as described above, and produce excessive drag and tend to wrinkle or break the film. To insure acceptable reduction in the striation level, at least 10 alternately disposed rolls should be used; 12–16 rolls appear to give optimum performance. As the speed increases, the greater the number of rolls that can be used, in relationship to the time and distance available for coating.

The solids or polymer content of the aqueous dispersion in the invention will vary depending upon the nature and water content of the hydrophilic base film to be coated, the thickness of the base film, and upon the coating thickness desired. The solids content, however, also affects the viscosity, which is an important property of the dispersion in relation to coating at high speeds. The viscosity should not exceed 25 centipoises, and preferably should fall within the range of 5–10 centipoises. The solids content of the aqueous dispersion may range from 17% to 65%. The content comprised within the range of 25%–50% generally gives the best results. The preferred total thickness of the finished dry surface on both sides of the film lies within the range corresponding to 2.5–10 grams of said dry coating per square meter.

The following examples will serve to further illustrate the principles and practice of this invention.

*Example 1*

An aqueous dispersion of a copolymer of vinylidene chloride, methyl acrylate, itaconic acid was prepared according to the following formula:

| | Parts by weight |
|---|---|
| Water | 286 |
| "Duponol" WAQ [1] (30% water solution) | 10 |
| Itaconic acid | 3 |
| Methyl acrylate | 18 |
| Vinylidene chloride | 282 |
| Ammonium persulfate | [2] 0.6 |
| Meta-sodium bisulfate | [2] 0.3 |
| Ferrous ammonium sulfate | [2] 0.0075 |

[1] Sodium lauryl sulfate.
[2] Added separately as solutions in 2–3 parts water. This water deducted from initial quantity.

The dispersion was prepared by placing these ingredients in the order indicated into a vessel fitted with a reflux condenser. The mixture refluxed maintaining the temperature between 32° C. and 36° C. as polymerization progressed. The mixture was stirred until refluxing ceased, whereby indicating the completion of copolymerization. Upon completion of the reaction, a solution of:

| | Parts by weight |
|---|---|
| "Duponol" WAQ [*1] | 10.0 |
| "Daxad" 11 [2] | 1.2 |
| "Santomerse" 3 [**3] | 8.0 |
| Water (dissolution) | 12.5 |
| Hydrogen peroxide [*] | 2.5 |
| Ethylene glycol | 168.0 |

[*] 30% solution.
[**] 75% solution.
[1] Sodium lauryl sulfate.
[2] Manufactured by Dewey & Almy, Inc.—Sodium salt of the condensation product of naphthalene sulfonic acid and formaldehyde.
[3] Manufactured by Monsanto Chemical Co.—Sodium dodecyl benzene sulfonate.

was added to stabilize the copolymer. The resulting dispersion was cooled and discharged through a filter. The dispersion containing 39.5% solids of 94/6/1 weight ratio of vinylidene chloride/methyl acrylate/itaconic acid copolymer and 21% ethylene glycol and having a viscosity of 9 centipoises was applied to regenerated cellulose film by conducting a 0.00088" thick film into a dip tank of the dispersion, then between accurate doctor rolls to remove the excess bath and meter the desired quantity of bath onto the film. Immediately after leaving the doctor rolls, the still wet coated film was conducted vertically through a bank of smoothing rolls consisting of twelve 2" diameter polished rolls placed tangential to the film alternately located, 6 on each side. The rolls were rotating with a peripheral speed of 76% of the film speed in the reverse direction to that of the film. The film was then passed through a vertical dryer to remove excess moisture and was then wound into a roll. Six grams per square meter of polymer (dry) were applied to the film which was moving at a speed of 150 yards per minute.

The coated film was transparent and satisfactory in appearance.

*Example 2*

The process of Example 1 was repeated except that the smoothing rolls were not used, the film being passed directly into the dryer after leaving the doctor rolls. The resultant film was unsatisfactory in appearance, having heavy ridges in the coating (striations) which ran in the machine direction.

*Example 3*

The process of Example 1 was repeated except that the rotational speed of the smoothing rolls was varied, samples of coated film being collected at each speed with the results shown in the table below.

| | Smoothing Roll Surface Speed (Percent of Film Speed) | Striation Appearance (Grade) |
|---|---|---|
| (a) | 60 | 4 |
| (b) | 65 | 3 |
| (c) | 70 | 2½ |
| (d) | 75 | 2 |
| (e) | 80 | 2½ |
| (f) | 85 | 3 |
| (g) | 93 | [1] |

[1] Film broke due to high tension.

Striation appearance is a comparative measure of the striae which appear as a series of parallel lines in the coating. Striations were projected onto a screen by means of a Sylvania C25/DC/5 concentrated arc lamp placed between film and screen. In this way, samples were graded by comparison, as follows:

Grade 1—Absence of striations—Excellent appearance
Grade 2—Slight striations—Good appearance
Grade 3—Moderate striations—Borderline appearance
Grade 4—Unacceptable striations.

The optimum smoothing roll speed is thus seen to be 75% of the film speed.

*Example 4*

The process of Example 1 was repeated except that the number of smoothing rolls was varied with the results indicated below:

|     | No. of Rolls | Striation Grade |
|-----|--------------|-----------------|
| (a) | 6            | 4               |
| (b) | 10           | 3               |
| (c) | 12           | 2               |
| (d) | 16           | 1½              |

The optimum number of smoothing rolls at 150 yards per minute coating speed was 12 since despite the superior smoothing with 16 rolls, excessive film tension rendered operation undesirable with this number of rolls since wrinkles and excessive breaks resulted. Sixteen rolls reached into the more viscous region of the bath due to advanced water penetration.

*Example 5*

Example 4 was repeated except that the coating speed was raised to 200 yards per minute.

|     | No. of Rolls | Striation Grade |
|-----|--------------|-----------------|
| (a) | 6            | 4               |
| (b) | 10           | 3               |
| (c) | 12           | 2               |
| (d) | 16           | 1½              |

At a higher film speed 16 smoothing rolls operated entirely satisfactorily since a longer space after the doctor rolls is available for smoothing. Consequently, it is possible to produce a superior appearing film at higher speeds.

*Example 6*

Example 1 was repeated except the dispersion used was varied as to solids content by adding water as required to the initially prepared bath. The following table shows the degree of improved smoothing which results with bath of lower viscosity.

| Bath Solids | Centipoises Viscosity | Striation Grade |
|-------------|----------------------|-----------------|
| 39.5        | 9                    | 2               |
| 37.0        | 7½                   | 1¾              |
| 35.5        | 6                    | 1½              |

*Example 7*

The process of Example 1 was repeated except that the smoothing rolls were pressed beyond the point of tangency into the vertically moving film, thus increasing the degree of "wrap." The smoothing was relatively unaffected but tower operation was complicated in increased "drag" leading to wrinkles and a higher break frequency.

*Example 8*

The process of Example 1 was repeated except that the coating weight was varied with the indicated results:

| Coating Weight (Grams/Sq. Meter) | Striation Grade |
|----------------------------------|-----------------|
| 4                                | 3               |
| 5                                | 2½              |
| 6                                | 2               |
| 7                                | 1½              |
| 8                                | 1¼              |

Lower quantities of applied coating decrease the distance above the doctor rolls available for smoothing since the reduced amount of aqueous phase is absorbed more rapidly by the base sheet. Consequently, the lower the applied coating, the poorer the smoothing.

It should be obvious from the foregoing that the practice of the process of the present invention results in the reduction of the striations to a level acceptable by the trade, while permitting efficient production operations.

I claim:

1. A process for continuously coating a continuous, flexible, transparent film of hydrophilic organic polymeric material which comprises continuously applying a uniform coating of an aqueous dispersion coating composition having a viscosity not greater than 25 centipoises over the surfaces of an advancing continuous, flexible, transparent film of hydrophilic organic polymeric material advancing at a constant linear speed of at least 100 yards per minute; immediately thereafter tangentially contacting the coated surfaces of said advancing film with the surfaces of a bank of at least 10 positively driven, successively positioned, cylindrical surfaces alternately disposed on each side of said film and rotating in a direction opposite to the direction of travel of said film at a peripheral speed of from 65% to 85% of the linear speed of travel of said web and thereafter drying the coated film.

2. The process of claim 1 wherein the viscosity of said composition is from 5 to 10 centipoises and contains from 25% to 50% by weight of coating solids.

3. The process of claim 1 wherein said bank consists of 12–16 cylindrical surfaces.

4. The process of claim 1 wherein said film is regenerated cellulose film.

5. The process of claim 1 wherein the peripheral speed of said cylindrical surfaces is from 74% to 78% the linear speed of travel of said film.

6. A process for continuously coating continuous regenerated cellulose film with an aqueous dispersion of vinylidene chloride copolymer which comprises continuously applying a uniform coating of an aqueous dispersion of a vinylidene chloride copolymer having a viscosity not greater than 25 centipoises over the surfaces of an advancing continuous film of regenerated cellulose advancing at a constant linear speed of at least 100 yards per minute; immediately thereafter tangentially contacting the surfaces of the coated advancing film with the surfaces of a series of at least 10 positively driven smoothing rolls alternately disposed on each side of said film and rotating in a direction opposite to the direction of travel of said web at a peripheral speed of from 65% to 85% of the linear speed of travel of said film and thereafter drying the coated film.

7. The process of claim 6 wherein the viscosity of said dispersion is from 5 to 10 centipoises.

8. The process of claim 6 wherein said series consists of 12–16 rolls.

9. The process of claim 6 wherein the peripheral speed of said rolls is 74% to 78% of the linear speed of travel of said film.

References Cited in the file of this patent

UNITED STATES PATENTS

| 1,774,398 | Parker       | Aug. 26, 1930 |
| 2,159,151 | Hershberger  | May 23, 1939 |
| 2,364,904 | Keller       | Dec. 12, 1944 |
| 2,388,339 | Paxton et al.| Nov. 6, 1945 |
| 2,819,984 | Ackerman     | Jan. 14, 1958 |